US009400467B2

(12) United States Patent
Onishi et al.

(10) Patent No.: US 9,400,467 B2
(45) Date of Patent: Jul. 26, 2016

(54) IMAGE FORMING APPARATUS

(71) Applicant: KYOCERA Document Solutions Inc., Osaka-shi, Osaka (JP)

(72) Inventors: Shota Onishi, Osaka (JP); Masami Fuchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/190,009

(22) Filed: Feb. 25, 2014

(65) Prior Publication Data

US 2014/0239064 A1 Aug. 28, 2014

(30) Foreign Application Priority Data

Feb. 28, 2013 (JP) ................................ 2013-038770

(51) Int. Cl.
*G06K 13/06* (2006.01)
*G06K 13/24* (2006.01)
*G03G 15/00* (2006.01)

(52) U.S. Cl.
CPC ........ *G03G 15/5016* (2013.01); *G03G 15/5066* (2013.01)

(58) Field of Classification Search
USPC ........................................ 235/380, 440, 483
See application file for complete search history.

(56) References Cited

U.S. PATENT DOCUMENTS

| | | | | |
|---|---|---|---|---|
| 5,600,122 | A * | 2/1997 | Isono et al. | 235/483 |
| 2004/0262867 | A1 * | 12/2004 | Arceta et al. | 280/47.35 |
| 2009/0289116 | A1 * | 11/2009 | Copeland et al. | 235/440 |

FOREIGN PATENT DOCUMENTS

| | | | |
|---|---|---|---|
| JP | 08106240 | A | 4/1996 |
| JP | 11238108 | A * | 8/1999 |
| JP | 2005043950 | A | 2/2005 |
| JP | 2009192860 | A | 8/2009 |
| JP | 2010262118 | A | 11/2010 |
| JP | 2011203371 | A | 10/2011 |

* cited by examiner

*Primary Examiner* — Daniel Hess
(74) *Attorney, Agent, or Firm* — Alleman Hall McCoy Russell & Tuttle LLP

(57) ABSTRACT

An image forming apparatus according to one aspect of the present disclosure is an image forming apparatus of which the apparatus main body is provided with an IC card reader that reads data input to a noncontact IC card. The IC card reader is installed at an angle enabling a detection surface to face downward relative to the apparatus main body.

2 Claims, 4 Drawing Sheets

IMAGE FORMING APPARATUS

INCORPORATION BY REFERENCE

This application is based upon and claims the benefit of priority from the corresponding Japanese Patent Application No. 2013-038770 filed on Feb. 28, 2013, the entire contents of which are incorporated herein by reference.

BACKGROUND

The present disclosure relates to an image forming apparatus of which the apparatus main body is provided with an IC card reader for reading data input to a noncontact IC card.

An image forming apparatus such as a copier that forms an image on a sheet by an electrographic system is provided with an IC card reader, and when a noncontact IC card to which data such as a personal code is input is placed over a detection surface of the IC card reader, the data input to the IC card is read by the IC card reader.

In the image forming apparatus provided with such an IC card reader, the IC card reader is fixedly arranged beside an operation portion at an upper part of the apparatus main body, for example, and it is not possible to freely adjust an angle of the IC card reader.

Meanwhile, in a conventional art, as an image forming apparatus of which the apparatus main body is provided with an IC card reader that inputs a personal code, there is proposed a configuration such that when an operator inputs the personal code by using the card, the height of the image forming apparatus is automatically controlled to reach a height corresponding to the input code by a lifting device.

However, in the conventional image forming apparatus, the IC card reader is installed at an upper surface and the like of the apparatus main body, and it is not possible to freely adjust the angle. Thus, it is difficult for a wheelchair user or even a healthy person with a different physical constitution (height) to place the IC card over the detection surface of the IC card reader.

SUMMARY

An image forming apparatus according to one aspect of the present disclosure is an image forming apparatus of which the apparatus main body is provided with an IC card reader that reads data input to a noncontact IC card. The IC card reader is installed at an angle enabling a detection surface to face downward relative to the apparatus main body.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below on the basis of the attached drawings.

Figure 1:
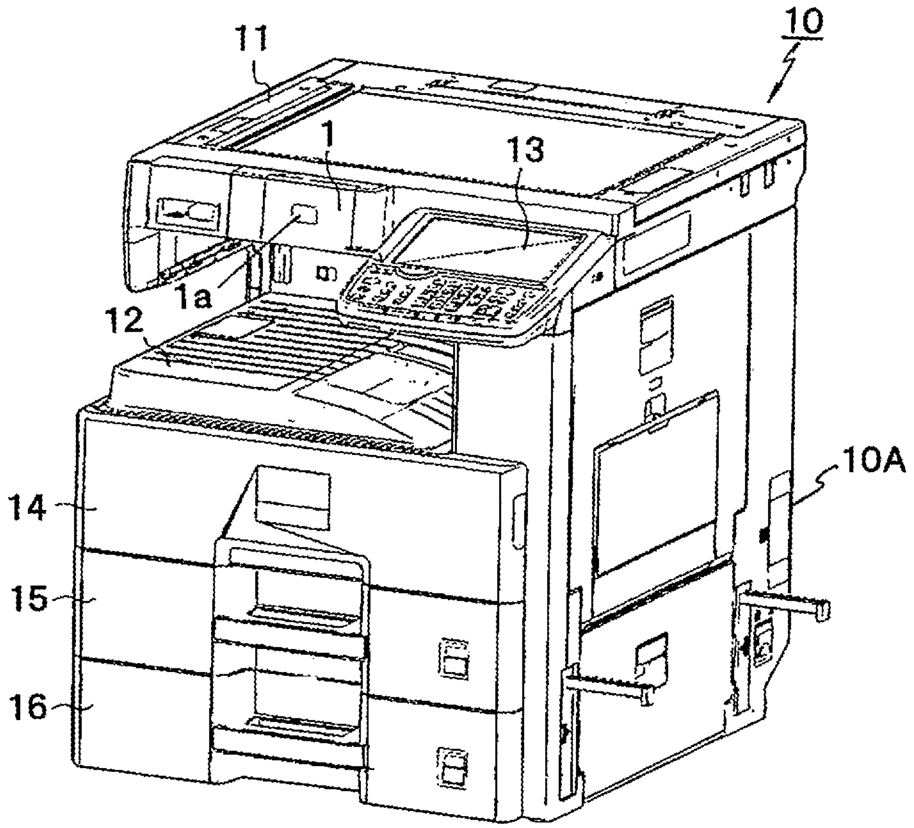
FIG. 1 is a perspective view of an image forming apparatus according to the present disclosure.

An image forming apparatus 10 shown in FIG. 1 is a copier of an internal discharge type; at an upper part of an apparatus main body 10A of the image forming apparatus 10, an image reading portion 11 is installed, and at a lower part thereof, a discharge tray 12 for internal discharge is formed. Further, at a front lateral end of the image reading portion 11, an operation portion 13 is arranged. At a substantially vertical wall beside the operation portion 13, an IC card reader 1 is installed. The IC card reader 1 is supported rotatably by a mechanism described below, and it is possible to optionally adjust an inclination angle thereof.

Further, below the discharge tray 12 of the image forming apparatus 1 shown in FIG. 1, paper feeding cassettes 14, 15, and 16 formed in upper to lower three stages are installed to be drawable toward a near side, and in each of the paper feeding cassettes 14 to 16, a plurality of pieces of sheets (not shown) are accommodated in a stacked state. It should be noted that although not shown, the apparatus main body 10A is provided internally with various types of processing devices such as: a photoconductor drum that is an image carrier; a charger that uniformly charges the surface of the photoconductor drum; a Laser Scanner Unit (LSU) that exposes and scans laser light onto the surface of the charged photoconductor drum so as to form an electrostatic latent image according to image information; a developing device that develops the electrostatic latent image formed on the photoconductor drum by a toner that is a developer, so that the electrostatic latent image is visible; a transfer machine that transfers a toner image formed on the photoconductor drum onto a sheet; and a fixing device that heats and pressurizes the toner image transferred onto the sheet, so that the toner image is fixed. At the right and back of the discharge tray 12, walls are formed; the front and left thereof are opened. Inside the right wall, some processing devices such as a fixing device are accommodated, and the sheet on which the image is formed is discharged onto the discharge tray 12 from a discharge opening formed on the left wall surface facing the discharge tray 12. Further, the image reading portion 11 is supported on the apparatus main body 10 by the right and back walls. The operation portion 13 is arranged, above the right wall, at the front lateral end of the image reading portion 11.

Figure 2A:
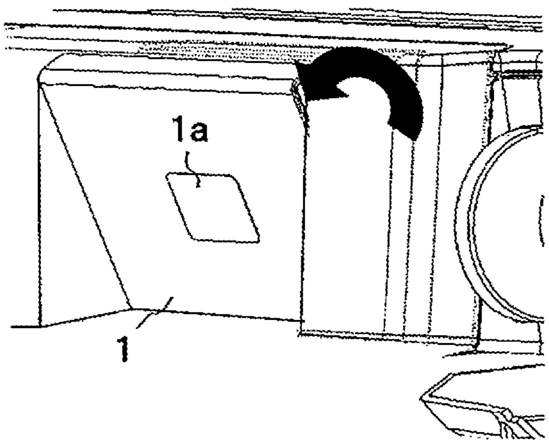
FIG. 2A and FIG. 2B are a perspective view of an IC card reader installation portion of an image forming apparatus according to the present disclosure.

Meanwhile, when the noncontact IC card personally held by a user is placed over a planar detection surface 1*a*, the IC card reader 1 reads data such as a personal code input to the IC card, and in the present embodiment, as described above, the IC card reader 1 is rotatable, and, for example, when used by a wheelchair user, it is possible to rotate the IC card reader 1 in the direction of the arrow as shown in FIG. 2A so as to change the angle obliquely downward. Thus, when the IC card reader 1 is inclined obliquely downward, even a wheelchair user finds it easy to place the IC card over the detection surface 1*a* of the IC card reader 1, and thus, reading operability thereof is improved.

Alternatively, when a user is tall, it is possible to change the angle of the IC card reader 1 obliquely upward by rotating the IC card reader 1 in the direction of the arrow as shown in FIG.

2B. Thus, when the IC card reader 1 is inclined obliquely upward, even a tall user finds it easy to place the IC card over the detection surface 1*a* of the IC card reader 1, and thus, the reading operability is improved. Further, it is possible to optimally adjust the inclination angle of the IC card reader 1 in accordance with the height of the user, and thus, it becomes easier to place the IC card over the detection surface 1*a* of the IC card reader 1 irrespective of a difference in height and the like of a user and the operability is improved for all the users.

Next, a specific configuration of an angle adjusting mechanism of the IC card reader 1 will be described with reference to FIG. 3.

Figure 3:
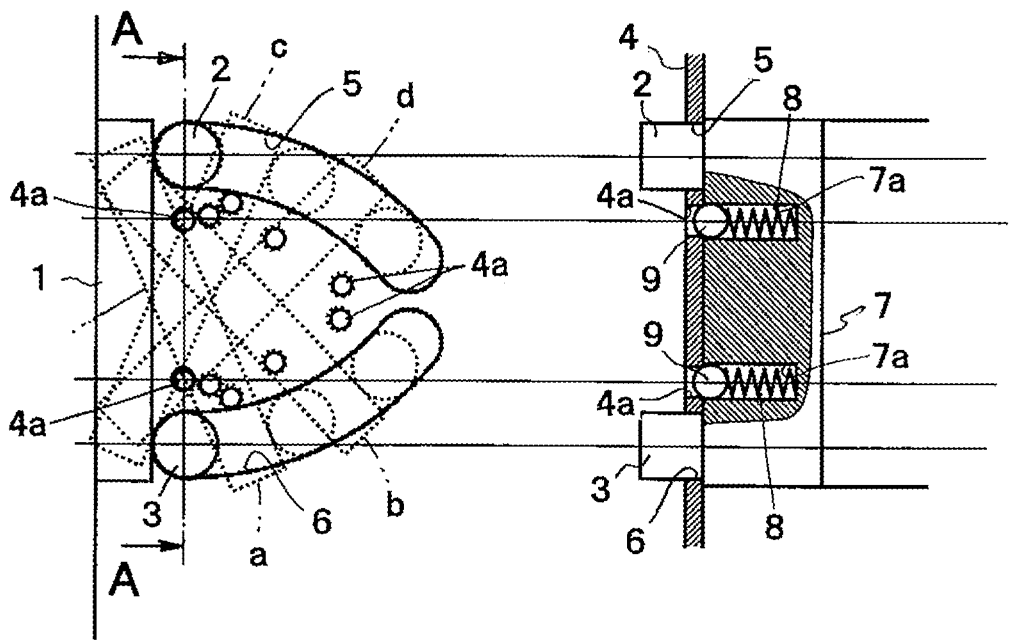
FIG. 3 is a diagram showing a rotation mechanism of an IC card reader in an image forming apparatus according to the present disclosure; the left part is a lateral view and the right part is a sectional view taken along A-A line of the left part.

At the rear surface of both right and left ends of the IC card reader 1, two column-like engagement protrusions 2 and 3 (only one of the two is shown in FIG. 3) are each installed vertically, and the engagement protrusions 2 and 3 are slidably engaged with arc-like engagement holes 5 and 6, respectively, formed in a frame 4 of the apparatus main body 10A.

Further, block bodies 7 (only one of the two is shown in the right part of FIG. 3) as shown in the right part of FIG. 3 are attached at the right and left of the rear surface of the IC card reader 1, and at upper and lower parts of each of the block bodies 7, a lateral hole 7*a* that opens outward (toward the left of the right part of FIG. 3) is each formed. Further, the lateral hole 7*a* each accommodates a spring 8 and a ball 9 biased outward by the spring 8. Further, as shown in the left part of FIG. 3, at a plurality of locations of each frame 4, a circular hole 4*a* with which the ball 9 is selectively engaged is formed. It should be noted that the spring 8, the ball 9, and the circular hole 4*a* constitute a lock mechanism for fixing the IC card reader 1 at a predetermined angle position.

When the IC card reader 1 provided with the angle adjusting mechanism thus configured is rotated counterclockwise (in the direction of the arrow in FIG. 2A) in the left part of FIG. 3 around the upper engagement protrusion 2, for example, the lower engagement protrusion 3 is slid along the lower engagement hole 6 and the IC card reader 1 is adjusted so that the inclination angle faces obliquely downward as shown by a dotted line a or a dotted line b in the left part of FIG. 3. At this time, the ball 8 constituting the lock mechanism is engaged with the circular hole 4*a* of the frame 4, and as a result, the IC card reader 1 is fixed at the adjusted angle position.

Figure 2B:
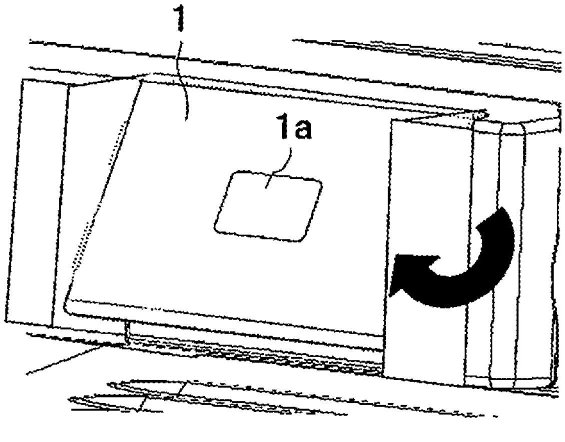

Alternatively, when the IC card reader 1 is rotated clockwise (in the direction of the arrow in FIG. 2B) in the left part of FIG. 3 around the lower engagement protrusion 3, the upper engagement protrusion 2 is slid along the upper engagement hole 5 and the IC card reader 1 is adjusted so that the inclination angle faces obliquely upward as shown by a dotted line c or a dotted line d in the left part of FIG. 3. At this time, the ball 9 constituting the lock mechanism is engaged with the circular hole 4*a* of the frame 4, and as a result, the IC card reader 1 is fixed at the adjusted angle position.

Thus, according to the present disclosure, it is possible even for a wheelchair user or a user different in height to adjust the inclination angle of the IC card reader 1 to the optimal angle for a user, and thus, it becomes easier to place the IC card over the IC card reader 1 to obtain an effect that the operability is improved. For example, it is easier even for a short user to place the IC card over the IC card reader 1, and thus, the operability is improved. When the detection surface 1*a* of the IC card reader 1 is adjusted to an upward-facing inclination angle, an upper end side of the detection surface 1*a* is moved backward from the substantially vertical front wall of the image forming apparatus 1. When the detection surface 1*a* is adjusted to a downward-facing inclination angle, a lower end of the detection surface 1*a* is moved backward from the substantially vertical front wall of the image forming apparatus 1. This prevents the detection surface 1*a* from protruding forward from the substantially vertical front wall of the image forming apparatus 1 so that the visibility of the discharge tray 12 arranged therebelow is not impaired. Accordingly, it is possible for a user to easily take out printed matter discharged to the discharge tray 12.

Figure 4:
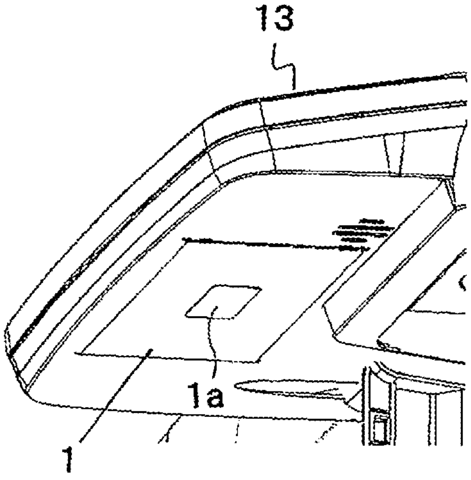
FIG. 4 is a perspective view obtained when an IC card reader installation portion of an image forming apparatus according to another mode of the present disclosure is seen obliquely from below.

It should be noted that in the above embodiment, the IC card reader 1 is installed substantially vertically on the front of the image reading portion 11 of the image forming apparatus 10; however, the IC card reader 1 may be installed substantially horizontally at a bottom surface of the operation portion 13 as shown in FIG. 4. It is possible to effectively utilize an existing configuration for a member and space for attaching the IC card reader 1. This eliminates need of newly arranging the space or configuration for arranging the IC card reader, for example, and thus, it is possible not only to simplify design of the apparatus but also to reduce a cost of the apparatus. Alternatively, in the configuration shown in FIG. 4, it may be possible such that the IC card reader 1 is rendered rotatable as in the above so that the inclination angle can be optionally arranged.

With the configuration shown in FIG. 4, it is possible even for a wheelchair user to easily place the IC card over the IC card reader 1 to improve the operability. Further, the operation portion 13 is arranged above the right wall so that the visibility of the discharge tray 12 is not impaired. Accordingly, the IC card reader 1 is arranged at a location other than the bottom surface of the operation portion 13, and as a result, it is possible to avoid decrease in the visibility of the discharge tray 12.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus of which the apparatus main body is capable of installing an IC card reader that reads data input to a noncontact IC card, wherein the IC card reader is installed at an angle enabling a detection surface thereof to face downward relative to the apparatus main body, wherein the IC card reader is installed rotatable relative to the apparatus main body and is configured such that an inclination angle of the detection surface is adjustable, when two respective engagement protrusions arranged at a position apart from each other in the IC card reader are engaged with arc-like engagement holes formed at a side of the apparatus main body, the IC card reader is rendered rotatable around one of the engagement protrusions so that the inclination angle is adjustable, when a lower engagement protrusion among the two engagement protrusions is moved alone a lower engagement hole among the arc-like engagement holes around an upper engagement protrusion among the two engagement protrusions, the IC card reader is adjusted so that the inclination angle faces obliquely downward, and when the upper engagement protrusion is moved alone an upper engagement hole among the arc-like engagement holes around the lower engagement protrusion, the IC card reader is adjusted so that the inclination angle faces obliquely upward, the image forming apparatus further comprises a lock mechanism that locks a rotation position of the IC card reader, a block body in which a lateral hole that opens outward is formed is provided on a rear surface of the IC card reader, the lock mechanism includes:

a spring disposed in the lateral hole of the block body;

a ball disposed in the lateral hole and biased outward by the spring; and a circular hole which is formed in the apparatus main body and with which the ball is selectively engaged, and when the ball is engaged with the circular hole, a rotation position of the IC card reader is locked.

2. An image forming apparatus of which the apparatus main body is capable of installing an IC card reader that reads data input to a noncontact IC card, wherein the IC card reader is installed at an angle enabling a detection surface thereof to face downward relative to the apparatus main body, wherein the IC card reader is installed rotatably relative to the apparatus main body and is configured such that an inclination angle of the detection surface is adjustable, the IC card reader is configured such that the detection surface thereof is changeable in posture to an inclination angle alone a substantially vertical front surface of the apparatus main body and to an inclination angle facing downward and upward from the substantially vertical surface, when two respective engagement protrusions arranged at a position apart from each other in the IC card reader are engaged with arc-like engagement holes formed at a side of the apparatus main body, the IC card reader is rendered rotatable around one of the engagement protrusions so that the inclination angle is adjustable, when a lower engagement protrusion among the two engagement protrusions is moved alone a lower engagement hole among the arc-like engagement holes around an upper engagement protrusion among the two engagement protrusions, the IC card reader is adjusted so that the inclination angle faces obliquely downward, and when the upper engagement protrusion is moved alone an upper engagement hole among the arc-like engagement holes around the lower engagement protrusion, the IC card reader is adjusted so that the inclination angle faces obliquely upward, the image forming apparatus further comprises a lock mechanism that locks a rotation position of the IC card reader, a block body in which a lateral hole that opens outward is formed is provided on a rear surface of the IC card reader, the lock mechanism includes:

a spring disposed in the lateral hole of the block body;

a ball disposed in the lateral hole and biased outward by the spring; and a circular hole which is formed in the apparatus main body and with which the ball is selectively engaged, and when the ball is engaged with the circular hole, a rotation position of the IC card reader is locked.

* * * * *